United States Patent [19]

Mimura et al.

[11] Patent Number: 5,407,724
[45] Date of Patent: Apr. 18, 1995

[54] LAMINATED POLYESTER FILM FOR HEAT-SENSITIVE IMAGE TRANSFER MATERIAL

[75] Inventors: Takashi Mimura, Otsu; Seizo Aoki, Shiga; Kazuo Matsuura, Otsu; Kenji Tsunashima, Kyoto, all of Japan

[73] Assignee: Toray Industries, Inc., Japan

[21] Appl. No.: 78,775

[22] Filed: Jun. 17, 1993

Related U.S. Application Data

[63] Continuation of Ser. No. 721,555, Jul. 12, 1991, abandoned.

[30] Foreign Application Priority Data

Jun. 28, 1990 [JP] Japan ................................. 2-173304
Jun. 28, 1990 [JP] Japan ................................. 2-173305
Nov. 14, 1990 [JP] Japan ................................. 1-295553

[51] Int. Cl.$^6$ ............................................... B32B 5/16
[52] U.S. Cl. ................................. 428/141; 428/327; 428/409; 428/484
[58] Field of Search ............... 428/327, 409, 480, 340, 428/341, 484, 141

[56] References Cited

U.S. PATENT DOCUMENTS

| | | | |
|---|---|---|---|
| 4,233,352 | 1/1979 | Ono et al. | 428/141 |
| 4,732,814 | 3/1988 | Hatada et al. | 428/480 |
| 4,774,128 | 9/1988 | Koshizuka et al. | 428/212 |
| 4,853,274 | 8/1989 | Makishima et al. | 428/143 |
| 4,977,020 | 12/1990 | Utsumi | 428/323 |
| 5,061,565 | 10/1991 | Aoki et al. | 428/409 |
| 5,085,933 | 2/1992 | Katoh et al. | 428/332 |
| 5,204,189 | 4/1993 | Ueyama et al. | 428/484 |
| 5,229,189 | 7/1993 | Hiyoshi et al. | 428/195 |
| 5,264,279 | 11/1993 | Imamura et al. | 428/323 |

FOREIGN PATENT DOCUMENTS 53-128683  11/1978  Japan .

Primary Examiner—D. S. Nakarani
Assistant Examiner—H. Thi Lê
Attorney, Agent, or Firm—Austin R. Miller

[57] ABSTRACT

A film suitable as a base of image transfer material for thermal recording or a heat-sensitive mimeograph stencil is disclosed. The laminated film of the present invention comprises a coating layer on at least one surface of a polyester film, which coating layer contains as a major component a wax-based composition and has protrusions with length/width ratios of not less than 3 at a density of not less than 20 protrusions/100 $\mu m^2$. The film of the present invention, when used as a base of an image transfer material for thermal recording or as a film for heat-sensitive mimeograph stencil, the running property is good, abrasion and staining of the head are very small, shedding of ink when the ink is applied does not occur, and the adhesion of the ink, clearness of printed characters, anti-sticking property, holing property and clearness of printing are excellent.

12 Claims, No Drawings

／／5,407,724

LAMINATED POLYESTER FILM FOR HEAT-SENSITIVE IMAGE TRANSFER MATERIAL

This application is a continuation of application Ser. No. 07/721,555, filed Jul. 12, 1991, now abandoned.

TECHNICAL FIELD

The present invention relates to a laminated polyester film. More particularly, the present invention relates to a base film suited for image transfer material for thermal recording and for heat-sensitive mimeograph stencil.

BACKGROUND ART

Recently, various recording systems have been developed with the development of office automation. Among these, thermal recording systems with which the noise during printing is small and the operation is simple are drawing attention. In the thermal recording system, a thermal recording apparatus such as a thermal printer is used. A recording paper and a heat-sensitive ink layer of an image transfer material are contacted and the film is selectively heated by pulse signals generated from a heating head opposite to the ink layer. The ink heated via the film is melted or sublimated so as to be transferred to the recording paper.

As the image transfer material, thin plastic films are generally used for promoting thermal efficiency. However, in cases where a plastic film is used as the base film of the image transfer material, a part of the film is melted by the heat given by the thermal head and the melted plastic sticks to the thermal head. This phenomenon is called sticking phenomenon. If this phenomenon occurs, not only the image transfer material does not run smoothly, but also the thermal head is severely stained, so that the clearness of the printed characters is degraded. To avoid the sticking phenomenon, it has been proposed to give various surface treatments to the surface of the plastic film, which contacts the thermal head. For example, those having a heat-resistant protective layer made of silicone, melamine resin, phenol resin, epoxy resin, polyimide or the like (Japanese laid-open patent application (Kokai) No. 55-7467) and those having a sticking-preventing layer made of an inorganic pigment with a high activity and a resin with high heat-resistance (Japanese laid-open patent application (Kokai) No. 56-155794) were proposed. Further, those in which a layer made of a water-soluble or water-dispersible silicone and a resin is provided (Japanese laid-open patent application (Kokai) No. 60-192628), those in which a layer made of a water-dispersible fluorine-contained resin and a water-soluble polymer (Japanese laid-open patent application (Kokai) No. 60-192630), and those in which a wax and/or a liquid or a substance which is in the form of liquid or paste at room temperature is applied or transferred (Japanese laid-open patent application (Kokai) Nos. 59-148697 and 60-56583) have been disclosed.

However, with those having a heat-resistant protective layer, since the slipping between the film and the head is insufficient, the running property of the thermal transfer ribbon is poor in printers with low pulse width or in printers of platen-driving type, so that printing blot may be formed and, in an extreme case, the running of the ribbon is stopped.

With the films to which an inorganic pigment is added, the lifetime of the head is shortened due to the friction between the film and the head. Further, since the surface of the film is rough, heat-conductivity is low, so that clearness of the printed characters is poor. With those in which silicone resin or fluorine-contained resin is coated, by winding the film into a roll, the resin is likely to be transferred to the surface to which ink is to be applied, so that the film may shed the ink when the ink is applied to the film or the adhesion of the ink to the film may be poor.

Although the laminated films prepared by applying a wax or the like on a plastic film and drying the wax exhibits good slipping between the film and the head, the slipping between the film and the fixing shafts of the printer is poor, so that sticking may occur in the event.

On the other hand, conventional heat-sensitive mimeograph stencils typically comprises a film for heat-sensitive mimeograph stencil and a porous support adhered to the film with an adhesive. Conventional films for heat-sensitive mimeograph stencil includes vinyl chloride-vinylidene chloride copolymer films, polypropylene films and polyethylene terephthalate films. Recently, for promoting the sensitivity, the film was made thin and other improvements were made as described in Japanese laid-open patent application (Kokai) Nos. 62-149469 and 63-312192. As the porous support, tissue paper and polyester gauze have been used.

These laminates are overlapped with an original carrying characters or figures and infrared flash is irradiated thereto. As a result, the portions of the characters or figures are melted by absorption of heat and holed. The thus holed original is used as a stencil for printing. Recently, the holing is also carried out by using a thermal printer. In this method, a thermal head is contacted with the film and printing energy is given to the film according to the same principle as in the ordinary thermal image transfer system so as to hole the film. Thus, in the above-described flash-irradiation method, good release from the original is required, and in the thermal method, anti-sticking property is required as in the heat-sensitive image transfer material.

However, in cases where a plastic film is used as a film for heat-sensitive mimeograph stencil, the sticking phenomenon due to the heat given to the film by the thermal head is generally observed. This phenomenon causes poor running of the film and staining of the thermal head, which degrade the clearness of the holing, as in the case of heat-sensitive image transfer material. On the other hand, in cases where the holing is carried out by using a flash lamp, the film and the original may be fused. To eliminate this, releasing layer or anti-sticking layer is formed. However, when the film is used for mimeograph stencil, the releasing layer or the anti-sticking layer is required to be easily melted by heat. Therefore, if the above-mentioned heat-resistant protective layer is used, the holing may be non-uniformly conducted or, in an extreme case, holes are not formed.

DISCLOSURE OF THE INVENTION

Accordingly, the object of the present invention is to provide a laminated polyester film for heat-sensitive image transfer material free from the above-mentioned drawbacks, that is, a laminated film with which sticking does not occur, of which running property is good in a wide range from low pulse width range employed in word processors, facsimile machines and bar code readers to high pulse width range employed in video printers, with which the abrasion and staining of head is small, with which the shedding of ink when ink is applied does not occur, with which the adhesion of the ink and the clearness of the printed characters are good. The object of the present invention is also to provide a laminated polyester film suited as a film for heat-sensitive mimeograph stencil free from the above-described drawbacks, that is, a laminated film which exhibits good releasing property, good anti-sticking property and good holing property, and with which the clearness of the printing is good.

As a result of intensive study, the present inventors discovered that a laminated film excelling in anti-sticking property, running property and releasing property may be obtained by providing on a polyester film a coating layer having specific protrusions, to complete the present invention.

That is, the present invention provides a laminated polyester film comprising a coating layer on at least one surface of a polyester film, which coating layer contains as a major component a wax-based composition, said coating layer having protrusions with length/width ratios of not less than 3 at a density of not less than 20 protrusions/100 $\mu m^2$.

The laminated film according to the present invention has a coating layer on at least one surface of the polyester film a coating layer containing as a major component a wax-based composition. By virtue of the specific protrusions formed on the surface of the coating layer, the laminated film of the present invention exhibits the following excellent properties when used as a base film for heat-sensitive image transfer material or as a film for heat-sensitive mimeograph stencil:

1) no sticking occurs during running of the film;
2) shedding of ink is small and the adhesion of the ink to the film is good; and
3) staining and abrasion of the thermal head is small. When the film is used as a heat-sensitive mimeograph stencil, the film further exhibits the following excellent properties:

1) no sticking occurs during holing by the thermal system; and
2) the sensitivity of holing is high, so that clear printing can be attained.

BEST MODE FOR CARRYING OUT THE INVENTION

The gist of the present invention resides in a laminated polyester film comprising a coating layer on at least one surface of a polyester film, which coating layer contains as a major component a wax-based composition, the coating layer having protrusions with a length/width ratio of not less than 3 at a density of not less than 20 protrusions/100 $\mu m^2$.

The term "polyester film" used herein includes all polymer films in which ester bond constitutes the main bond in the main chain of the polymer. Among the polyester films, those especially preferred as a film for heat-sensitive image transfer material include polyethylene terephthalate films, polyethylene 2,6-naphthalate films, polyethylene $\alpha,\beta$-bis(2-chlorophenoxy)ethane 4,4-dicarboxylate films, polybutylene terephthalate films and the like. Among these, in view of quality and economy, polyethylene terephthalate films are most preferred. Thus, the description hereinbelow will proceed taking the polyethylene terephthalate films (hereinafter referred to as PET films) as the representative of the polyester film used as a base film for heat-sensitive image transfer material. The polyethylene terephthalate used herein contains ethylene terephthalate repeating units in the amount of not less than 80 mol %, preferably not less than 90 mol %, still more preferably not less than 95 mol %. Within this range, a part of the acid component and/or the glycol component may be replaced by the third component as follows:

Acid Components isophthalic acid, 2,6-naphthalene dicarboxylic acid, 1,5-naphthalene dicarboxylic acid, 2,7-naphthalene dicarboxylic acid, 4,4-diphenyldicarboxylic acid, 4,4-diphenylsulfondicarboxylic acid, 4,4-diphenylether dicarboxylic acid, p-$\beta$-hydroxyethoxy benzoic acid, azipic acid, azelaic acid, sebacic acid, hexahydroterephthalic acid, hexahydroisophthalic acid, $\epsilon$-oxycaproic acid, trimellitic acid, trimesic acid, pyromellitic acid, $\alpha,\beta$-bisphenoxyethane-4,4-dicarboxylic acid, $\alpha,\beta$-bis(2-chlorophenoxy)ethane-4,4-dicarboxylic acid, 5-sodium-sulfoisophthalic acid and the like Glycol Components propylene glycol, butylene glycol, hexamethylene glycol, decamethylene glycol, neopentyl glycol, 1,1-cyclohexane dimethanol, 1,4-cyclohexane dimethanol, 2,2-bis(4-$\beta$-hydroxyphenyl)propane, bis(4-$\beta$-hydroxyphenyl)sulfone, diethylene glycol, triethylene glycol, pentaerythritol, trimethylol propane, polyethylene glycol, polytetramethylene glycol and the like Known additives such as heat stabilizers, anti-oxidants, weathering agents, UV light absorbers, organic lubricants, pigments, dyes, organic and inorganic particles, fillers, anti-static agents, nucleating agents and the like may be added to the PET. By adding inorganic and/or organic particles so as to attain an average surface roughness of the PET film after orientation of preferably 0.03–0.4 $\mu m$, more preferably 0.05–0.2 $\mu m$, the running property may further be promoted.

The intrinsic viscosity (measured in o-chlorophenol at 25° C.) of the PET may preferably be 0.40–1.20 dl/g, more preferably 0.50–0.80 dl/g, still more preferably 0.5–0.75 dl/g.

In view of mechanical strength and dimensional stability, the PET film may preferably be a biaxially oriented film. The biaxially oriented PET film herein means those prepared by stretching a PET sheet at a stretching ratio of about 2.5–5.0 times the original length in the longitudinal and transverse directions, respectively, which exhibit a biaxially oriented pattern in wide angle X-ray analysis.

Although the thickness of the PET film is not restricted, in cases where the laminated polyester film of the present invention is used as a base film of a heat-sensitive image transfer material, the thickness of the laminated film may preferably be 0.5–30 $\mu m$, more preferably 1–10 $\mu m$ in view of the thermal conductivity and mechanical strength.

It is especially preferred to coat at least one surface of the PET film with a polyester resin having a glass transition point higher than that of the PET before the stretching and then to stretch the coated PET film since the wrinkles often formed by the printing energy are hardly formed and so the clearness of the printing is promoted. The polyester resin layer is preferably formed on the side contacting the thermal head. Representative example of the polyester having a higher glass transition point than PET is polyethylene 2,6-naphthalate.

On the other hand, in cases where the laminated polyester film of the present invention is used for heat-sensitive mimeograph stencil, the polyester films having an energy of fusion ($\Delta Hu$) of 3–11 cal/g, more preferably 5–10 cal/g are preferred. By adjusting the $\Delta Hu$ in this range, the releasing property from the original and the holing property may be promoted.

It is preferred that the difference in the temperature $\Delta Tm$ between the fusion terminating point and the fusion starting point of the polyester be 50°–100° C., more preferably 60°–90° C., since the light and shade and the unevenness in the thickness of the printed characters may be eliminated, so that clearer printing may be attained. The polyester having these characteristics may be obtained by copolymerizing the acid components and the glycol components mentioned above in the description of the PET films. Examples of the polyester having the characteristics include copolymers of isophthalic acid, azipic acid, sebacic acid and diethylene glycol, as well as mixtures of PET and these copolymers.

In cases where the film is used as a heat-sensitive mimeograph stencil, the base film is preferably biaxially oriented. If the base film is uniaxially oriented or non-oriented, unevenness of holing may be caused and voids are likely formed in the printed matter. Although the degree of biaxial stretching is not restricted, those having a plane orientation coefficient of 0.90–0.98 are especially preferred.

The center line average surface roughness (Ra) may preferably be 0.05–0.3 μm, more preferably 0.09–0.25 μm, and the maximum roughness (Rt) may preferably be 0.5–4.0 μm, more preferably 0.8–3.5 μm. If the average surface roughness and the maximum roughness are within these ranges, even if the film is thin, the film is free from folding wrinkles and the winding property is promoted, so that the degradation of the sensitivity due to the cloudiness of the film may be prevented.

The number of the protrusions with diameters of not less than 1 μm may preferably be 2000–10,000 protrusions/mm$^2$, more preferably 2500–8000 protrusions/mm$^2$ since both the slipperiness and the transparency are well satisfied. The number of protrusions with diameters of 8–20 μm may preferably be 20–1000 protrusions/mm$^2$ more preferably 50–800 protrusions/mm$^2$. If the number of these protrusions is less than 20 protrusions/mm$^2$ the film is likely to meander, and if it is more than 1000 protrusions/mm$^2$, the film is likely to break, so that the production efficiency tends to be lowered.

In cases where the film is used as a heat-sensitive mimeograph stencil, the rate of heat shrinkage may preferably be not less than 10%, preferably not less than 20% in the temperature range from the melting point to the temperature lower than the melting point by 20° C. If the rate of heat shrinkage within this temperature range is less than 10%, the sensitivity of mimeographing may be lowered to cause a practical problem. It is more preferred that the rate of shrinkage at 150° C. is less than 15%.

Although the thickness of the laminated polyester film of the present invention to be used as a film for heat-sensitive mimeograph stencil is not restricted, the thickness of the laminated film may preferably be 0.5–10 μm, more preferably 0.7–5.0 μm. If the thickness of the film is too small, the printing is unclear and unevenness in the depth of the printed characters is likely to be brought about. If the thickness of the film is too large, voids and unevenness in the thickness of the printed characters are likely to be brought about.

To attain the surface configuration, that is, the surface roughness and the number of protrusions of the polyester film to be used as a heat-sensitive mimeograph stencil, it is preferred to prepare a master polymer containing inactive particles in the polyester resin to be extruded, and to blend the master polymer in the main polymer. In this case, as the master polymer, those having a melting point higher than that of the main polymer by 10°–100° C., more preferably 20°–80° C. and/or having an intrinsic viscosity higher than that of the main polymer by 0.2–1.0 are preferred. Needless to say, the specific surface configuration may be more or less controlled by controlling the shearing stress and filter size employed in the extrusion step, and extrusion conditions or the like.

As the inactive particles to be used, those made of oxides or inorganic salts of the elements belonging to IIA group, IIIB group, IVA group or IVB group in the periodic table. Examples of those substances include synthetic or naturally occurring calcium carbonate, wet silica (silicon dioxide), dry silica (silicon dioxide), aluminum silicate (kaolinite), barium sulfate, calcium phosphate, talc, titanium dioxide, aluminum oxide, aluminum hydroxide, calcium silicate and the like. The inactive particles may preferably have an average particle diameter of 0.1–3.0 μm. Although the amount of the particles added varies depending on the material of the particles and on the particle size, for attaining the specific surface configuration, it is preferably 0.05–2.0% by weight, more preferably 0.1–1.0% by weight. To blend an additive having an absorption peak in the wavelength range of the flash to be irradiated is preferred since clearer holing may be accomplished.

The laminated film of the present invention has a layer containing as a major component a wax-based composition on at least one surface of the above-described polyester film. The term "main component" herein means that the weight ratio of the component is not less than 50%, preferably not less than 60% in the composition to be coated. The wax-based composition includes various commercially available waxes such as petroleum waxes, vegetable waxes, mineral waxes, animal waxes, low molecular polyolefins and the like, although not restricted thereto. Among these, petroleum waxes and vegetable waxes are preferred in view of the anti-sticking property.

Examples of the petroleum waxes include paraffin wax, microcrystalline wax, oxidized wax and the like. Among these, oxidized wax is especially preferred in view of the formation of the protrusions. Examples of the vegetable waxes include candelilla wax, carnauba wax, haze wax, oricurie wax, sugar cane wax, rosin-modified wax. In the present invention, as the wax-based composition, ester adducts of {rosin or disproportionated rosin or hydrogenated rosin.$\alpha,\beta$-substituted ethylene ($\alpha$ substituent: carboxylic group, $\beta$ substituent: hydrogen, methyl or carboxyl)adduct}.$C_1$–$C_8$ alkyl or $C_1$–$C_8$ alkenyl polyalcohol (number of repeating units: 1–6) are most preferred in view of the slipperiness and releasing property. It is more preferred to use the wax just mentioned above together with an oxidized wax. As will be described later, the laminated film of the present invention is prepared by stretching the film in one direction after applying a coating liquid containing the above-described composition so as to form fine and elongated protrusions. In view of the formation of the protrusion, explosion-proofing property and prevention of environmental pollution, waxes which are dissolved, emulsified or suspended in water are especially preferred.

In a preferred mode of the present invention, as the wax, a petroleum wax and a vegetable wax are co-employed. In this case, the mixing ratio of the petroleum wax to the vegetable wax may preferably be 10/90–90/10, more preferably 20/80–80/20, still more preferably 30/70–70/30 based on weight. The vegetable wax is preferably contained in the amount of not less than 10% by weight because the slipperiness and releasing property at high temperature are good, and the composition may be uniformly dispersed in emulsifying or suspending the composition in water, so that a uniform coating layer can be formed. The petroleum wax is preferably contained in the amount of not less than 10% by weight because the slipperiness of the coating layer is good, so that good running in high speed printing may be attained.

By adding an oily substance to the above-described wax-based composition, the running property in the high pulse width range may be further promoted. The oily substance herein means the oils in the form of liquid or paste at room temperature. The oily substance includes vegetable oils, fats and fatty oils, mineral oils, synthetic lubricating oils and the like. Examples of the vegetable oils include linseed oil, kaya oil, safflower oil, soybean oil, Chinese tung oil, sesame oil, corn oil, rapeseed oil, rice bran oil, cottonseed oil, olive oil, sasanqua oil, tsubaki oil, castor oil, peanut oil, palm oil, coconut oil and the like.

Examples of the fats and fatty oils include beef tallow, hog fat, mutton tallow, cacao butter and the like, and examples of the mineral oils include machine oil, insulation oil, turbine oil, motor oil, gear oil, cutting oil, liquid paraffin and the like. As the synthetic lubricating oil, those having the characteristics written in Chemical Large Dictionary (published by Kyoritsu Publishing Co.), that is, those having higher viscosity indices, lower flow points, better heat stabilities and oxidation stabilities, and less likely to ignite than petroleum lubricating oils may be optionally used. Examples of the synthetic lubricating oil include olefin polymer oils, diester oils, polyalkylene glycol oils, silicone oils and the like. Among these, mineral oils and synthetic lubricating oils which exhibit good running in the high pulse range are preferred. Mixtures of the oily substances may also be employed.

The oily substance may preferably be added to 100 parts by weight of the wax-based composition in the amount of 1–100 parts by weight, more preferably 3–50 parts by weight. If the content of the oily substance is less than 1 part by weight, the running property at the high pulse range employed in printers of sublimation type tends to be degraded. On the other hand, if the content of the oily substance is more than 100 parts by weight, the running property at the low pulse range during high speed printing tends to be degraded. If the content of the oily substance is within the above-described range, the sticking phenomenon does not occur in heat-sensitive image transfer printers of wide range of pulse width, so that good running may be attained.

The composition may contain various additives in the amount not adversely affecting the effect of the present invention. For example, anti-static agents, heat stabilizers, anti-oxidants, organic and inorganic particles, pigments and the like may be added. Further, in order to promote the dispersion in water and coating property of the coating liquid, various additives such as dispersing agents, surfactants, antiseptics, defoaming agents and the like may be added to the coating liquid.

The center line average surface roughness of the surface on which the coating layer is formed (Ra1) may preferably be 0.03–0.4 $\mu$m, more preferably 0.05–0.2 $\mu$m. The thickness of the coating layer may preferably be not less than 0.005 $\mu$m and not more than Ra1, preferably not less than 0.01 $\mu$m, not more than Ra1. If the Ra1 of the coating layer is less than 0.03 $\mu$m or the thickness of the coating layer is more than Ra1, the running property may be degraded and the head is likely to be stained. If the Ra1 is more than 0.4 $\mu$m, although the anti-sticking property is good, the clearness of the printed characters tends to be degraded.

In the laminated film of the present invention, the specific protrusions herein below described are formed on the surface of the coating layer. By virtue of the protrusions, a laminated film excelling in anti-sticking property, running property and releasing property, as well as in inking property and adhesion of ink, which could not be attained by the conventional films, was attained. More particularly, by forming elongated protrusions with a length/width ratio of not less than 3 on the surface of the coating layer made of the above-described composition at a density of not less than 20 protrusions/100 $\mu m^2$, the slipping between the film and the fixing shaft of the printer during running is made smooth and the friction in the platen roll driving is reduced, so that smooth running may be attained.

The protrusions must have an elongated shape, and must have a length/width ratio of not less than 3, preferably not less than 4, still more preferably not less than 5. If this ratio is less than 3, the slipping is not smooth and a part of the film may be stuck.

The density of the elongated protrusion must be not less than 20 protrusions/100 $\mu m^2$, preferably not less than 40 protrusions/100 $\mu m^2$, still more preferably not less than 60 protrusions/100 $\mu m^2$. If the density of the elongated protrusions is less than 20 protrusions/100 $\mu m^2$, the slipperiness at room temperature is low, so that smooth running in the printer cannot be attained.

Although the height of the protrusions is not restricted, it is preferably 0.005–1 $\mu$m, more preferably 0.01–0.5 $\mu$m. If the protrusions are too high, the clearness of the printed characters in the low pulse width range tends to be degraded. Although the length of the protrusions is also not restricted, usually, 0.1–2 $\mu$m is preferred.

The protrusions on the surface of the coating layer may preferably be mainly composed of the wax-based composition and the oily substance. In this case, since the protrusions are melted by the heat from the thermal head, unlike the cases wherein the protrusions are formed of inorganic particles, the heat is not transferred via air which has a low heat conductivity, so that very clear printed characters may be obtained. Thus, it is preferred that the coating layer on which the protrusions are formed do not contain a substance such as inorganic particles which is not melted by the heat from the thermal head, and that the coating layer be made of the above-described wax-based composition or a mixture thereof with the oily substance because the abrasion of the thermal head may be prevented. Even if the coating layer is made of the composition as used in the present invention, if the protrusions having the above-described shape are not formed thereon, sticking occurs and the running property of the film is severely degraded.

Although the elongated protrusions may be oriented in one direction, in view of the running property, those randomly arranged or crossing each other are preferred.

The laminated polyester film having the above-described elongated protrusions formed thereon is excellent in surface slipperiness, so that good running is attained in both high speed printing and low speed high pulse printing. However, if the static friction coefficient ($\mu S_1$) between the coating layer and a sodium glass at 25° C., 65% RH is not more than 0.3 and the ratio (($\mu S_2$)/($\mu S_1$)) of the static friction coefficient ($\mu S_2$) at 100° C. to the static friction coefficient at 25° C. ($\mu S_1$) is not more than 1.0, the anti-sticking property is further promoted and the staining of the head is more prevented. Such slipperiness may be controlled by controlling the thickness of the coating layer and the number of protrusions. More particularly, if the thickness of the coating layer is too small or too large so that the formation of protrusions is insufficient, the slipperiness tends to be degraded. In order that preferred protrusions are formed, the thickness of the coating layer may preferably be 0.01–0.1 $\mu$m.

It is difficult to obtain the above-mentioned coating layer by coating the composition on a biaxially oriented polyester film. The coating layer may be obtained by applying the composition on the polyester film before the orientation of the crystals and by stretching the coated polyester film after or during drying of the composition, followed by heat treatment so as to complete the orientation of the crystals. More particularly, the polyester film before the orientation of the crystals is stretched in the longitudinal direction at a stretching ratio of 2.5–5.0 times the original length. Then corona discharge treatment is performed on the surface on which the composition is to be applied. Thereafter, the composition is applied to the surface by using an applicator such as roll coater, gravure coater, reverse coater, kiss coater, bar coater or the like. While drying the composition or after drying the composition, the film is then stretched in the direction perpendicular to the longitudinal direction at a stretching ratio of 2.5–5.0 times the original length. As required, a heat treatment at 140°–240° C. is performed. By the above-described method, the coating layer having elongated protrusions may be obtained. To form randomly arranged elongated protrusions, it is important to make a small amount of water remain in the composition before the stretching of the film or to carry out the stretching while moisturizing the film, and to allow a small degree of relaxation during the heat treatment.

In cases where the film is used as a heat-sensitive mimeograph stencil, by coating the above-described composition on the above-mentioned base polyester film, a laminated film excelling in anti-sticking property and in holing by the thermal system and also excelling in releasing property from the original at the time of irradiation of flash may be obtained.

In the present invention, it is especially preferred to incorporate a polymer having sulfonic acid groups or salt thereof in the coating layer or to provide a layer containing a polymer including sulfonic acid group or salt thereof on the surface opposite to the coating layer, since the anti-static property and the adhesion between the film and a porous support by an adhesive may be promoted. To give anti-static property to the film is also effective for preventing the shedding of ink when the ink is applied, for preventing the static adsorption of dust during the process and for preventing the breaking of the thermal head by the discharging of the static charge. The polymer having sulfonic acid groups or salt thereof may be blended in the above-described wax-based composition or a layer containing the polymer having sulfonic acid groups or salt thereof may be provided on the surface of the polyester film opposite to the coating layer containing of the wax-based composition. It is preferred that the sulfonic acid groups or salt thereof are localized to the region apart from the polyester film in the direction of the thickness of the laminated film (the surface of the layer coated). Such localization of the sulfonic acid groups or salt thereof may be attained by the method described in Japanese patent application No. 63-18140.

The process of manufacturing the laminated polyester film of the present invention will now be described taking an example of the manufacturing process of the laminated polyester film for heat-sensitive image transfer material as a representative example.

After drying a PET containing the so called non-incorporated particles which are precipitated during the polymerization step and inorganic particles (for example, silica particles with an average particle size of 1 $\mu$m), the PET is melt-extruded and the melt-extruded sheet is cooled to obtain a non-oriented PET film. The non-oriented film is heated at 80°–120° C. and stretched in the longitudinal direction at a stretching ratio of 2.0–5.0 times the original length to obtain a uniaxially oriented film. Corona discharge treatment is performed in the air on one surface of the thus obtained uniaxially oriented film, and an aqueous dispersion containing the wax-based composition diluted to a prescribed concentration is applied on this surface. Then the thus coated film is stretched in the transverse direction at a stretching ratio of 3–5 times the original length while heating the film at 90°–140° C. The film is then introduced in a heat treatment zone at 140°–240° C. and the heat treatment is performed for 1–10 seconds. As required, relaxation of 3–12% in the transverse direction may be allowed during the heat treatment. The film is then slit into an appropriate width to obtain the biaxially oriented laminated polyester film.

In cases where the film is used as a heat-sensitive image transfer material, an ink of hot melt type or hot sublimation type is applied to the surface of the polyester film on which the coating layer is not formed, and the film is then slit into the desired width to obtain the film for heat-sensitive image transfer material.

The thus obtained biaxially oriented laminated polyester film for the heat-sensitive image transfer material may be used, after forming an appropriate ink layer suitable for the intended use, for printing out characters and images in, for example, word processors, facsimile machines, printers for personal computers, printers for videos, printers for bar codes, type writers, plane paper copier and the like.

[Methods for Measuring Characteristics and for Evaluating Effects]

(1) Formation of Protrusions on the Surface of the Coating Film

Photographs of the surface of the coating layer is taken by an electron microscope with a magnification of not less than 10,000 times. From the photographs, the shapes of the protrusions are observed and the length (longitudinal direction) and the width (direction perpendicular to the longitudinal direction) of the elongated protrusions are measured, and the length/width ratio is calculated. The number of the elongated protrusions per a unit area was counted from the micrograph, and was converted to the number per 100 $\mu m^2$.
(2) Center Line Surface Roughness (Ra1)

Center line surface roughness was measured in accordance with JIS-B0601-1976. The center-line mean roughness, when the roughness curve has been expressed by $y=f(x)$, shall be a value, being expressed in micrometer ($\mu m$), that is obtained from the following formula, extracting a part of measuring length l in the direction of its center-line from the roughness curve, and taking the center-line of this extracted part as X-axis and the direction of vertical magnification as Y-axis.

$$R_a = \frac{1}{l}\int_0^1 |f(x)|dx$$

The cut-off value of the roughness curve, when a high-pass filter of $-12$ dB/oct in attenuation factor has been used in obtaining the roughness curve, shall be the wave length corresponding to the frequency attaining a gain of 75%. The cutoff value was 0.25 mm.

(3) Thickness of Coating Film

Cross section of the laminated polyester film having the coating layer was observed with an electron microscope at a magnification of 100,000 times and the thickness of the coating layer was measured from the micrograph of the cross section. The thickness is the average of the maximum thickness and the minimum thickness in one field and average of the measurements of 30 fields was defined as the thickness of the coating layer.

(4) Static Friction Coefficient

The static friction coefficient between a sodium glass (with a center line surface roughness of not more than 0.01 $\mu m$) and the coating layer was measured in accordance with ASTM-D1894 using TR type friction meter commercially available from Toyo Seiki Seisakusho. The static friction coefficient at 25° C., 65% RH is referred to as $\mu S_1$ and the static friction coefficient between the coating layer and the sodium glass heated at 100° C. is referred to as $\mu S_2$.

(5) Hot Sticking Property 1 (Evaluation as Heat-sensitive Image Transfer Material)

The hot melt ink having the composition described below was applied on the surface of the laminated polyester film opposite to the coating layer by hot melt method to a thickness of 3–4 $\mu m$ to obtain an image transfer material.

| [Composition of Hot Melt Ink] | |
| --- | --- |
| Carnauba Wax | 100 parts by weight |
| Microcrystalline Wax | 30 parts by weight |
| Vinyl Acetate/Ethylene Copolymer | 15 parts by weight |
| Carbon Black | 20 parts by weight |

Using an image transfer thermal printer BC-8M KII commercially available from Autonix, the printing is performed using a thermal head with a head resistance of 500 Ω at a pulse width of 0.5 msec with varying voltage applied. The maximum voltage at which the sticking does not occur was determined and the evaluation was based on the maximum voltage. More particularly, if the maximum voltage at which the sticking does not occur is not less than 8 V, the anti-sticking property was evaluated to be good. If sticking occurs at a voltage of less than 8 V, the anti-sticking property was marked [X]. Normal paper was used as the paper on which printing is performed.

(6) Hot Sticking Property 2 (Evaluation as Heat-sensitive Image Transfer Material)

The hot sublimate ink having the composition described below was applied on the surface of the laminated polyester film opposite to the coating layer and dried, followed by slitting to an appropriate width to obtain an image transfer material.

| [Composition of Hot Sublimate Ink] | |
| --- | --- |
| Disperse Dye KST-B-136 (commercially available from Nippon Kayaku Co., Ltd.) | 4 parts by weight |
| Ethylhydroxyethyl Cellulose | 6 parts by weight |
| Methylethyl Ketone | 45 parts by weight |
| Toluene | 45 parts by weight |

The heat-sensitive image transfer material was used under normal conditions in a sublimation type printer (Color Video Printer GZ-P11W commercially available from Sharp Corporation), and the evaluation was performed based on the following criteria:

⊙: Sticking does not occur at all and very good running is attained.

: Although no problem exists in the running property and normal printing can be carried out, small sticking noise is heard when printing the paint-printing portions.

Δ: Printed characters can be managed to be read.

X: Sticking severely occurs and the printed characters cannot be read.

(7) Staining and Abrasion of Head (Evaluation as Heat-sensitive Image Transfer material)

After 3000 meters' printing with an applied voltage of 8 V and a pulse width of 0.5 msec in the above-described (5), the thermal head was taken out and the state of staining and abrasion of the head was observed with an optical microscope at a magnification of 100 times.

If the stained area of the head is less than 30%, mark "" was given and if the stained area of the head is not less than 30%, mark "X" was given. Even if the stained area is less than 30%, if the stain could not be removed by wiping it with ethanol, mark "X" was given. The head was checked for scratches and if no scratches were observed, mark "" was given and if a scratch was observed, mark "X" was given.

(8) Inking Property and Adhesiveness of Ink (Evaluation as Heat-sensitive Image Transfer Material)

The laminated polyester film was overlapped with a second polyester film such that the coating layer contacts the second polyester film. To the overlapped films, a load of 0.5 kg/cm² was applied and the film was left to stand at 70° C. for 24 hours. Thereafter, the films were peeled off each other and the ink described in (5) was applied to the surface of the second polyester film, which surface contacted the coating layer. The degree of shedding of the ink was observed. The ink was applied by hot melt method to a thickness of 3–4 $\mu m$.

If no shedding was observed at all, mark " was given and if shedding was observed even if it was very small, mark "X" was given. An adhesive tape having an adhesiveness of 50 g/cm² was pressed to the ink layer and then peeled off. If the peeled off area of the ink layer is less than 20%, mark "" was given and if it is not less than 20%, mark "X" was given.

(9) Anti-static Property

The surface specific resistance at an applied voltage of 100 V, at 20° C., 60% RH was measured by super insulation resistance meter MODEL-VE-40 (commercially available from Kawaguchi Denki Kogyo Co., Ltd).

[Evaluation as Film for Heat-sensitive Mimeograph Stencil]

(10) Energy of Fusion [ΔHu (cal/g)]

The energy of fusion was obtained from the area (a) of a region in the thermogram of the film during the fusion takes place, using a differential scanning thermometer type DSC-2 manufactured by Perkin-Elmer Co., Ltd.

The differential thermal curve deviates from the base line to the endothermic side as the heating continues and then returns to the base line. The area (a) is that of the region interposed between the deviated differential thermal curve and the straight line connecting the point at which the deviation of the differential thermal curve begins and the point at which the deviated curve returns to the base line. The same procedure was followed for indium to obtain the corresponding area (b) which is known as 6.8 cal/g. The energy of fusion was obtained by the following equation: a/b×6.8=ΔHu (cal/g)

(11) Difference Between the Fusion-starting Temperature and Fusion-terminating Temperature (ΔTm (°C.)]

Using the differential scanning thermometer type DSC-2 as in (10), the temperature at which the differential thermal curve begins to deviate from the base line was defined as the fusion-starting temperature ($T_1$° C.) and the temperature at which the deviated differential thermal curve returns to the base line was defined as fusion-terminating temperature ($T_2$° C.), and the ΔTm was obtained by the equation:

$$T_2 - T_1 = \Delta Tm(°C.).$$

In cases where the position of the each base line is difficult to clearly define, tangent line was drawn for each base line and the points at which the differential thermal curve starts to deviate, and returns to each tangent line were read.

In cases where ΔHu=0 cal/g, ΔTm is defined as ∞.

(13) Anti-sticking Property

A laminated film and a polyester gauze were overlapped and stuck, and holing was carried out by a thermal printer such that the coating layer contacts the thermal head. The level of the sticking in this operation was rated according to the following criteria. Those showing the level not lower than [] were evaluated to have good anti-sticking property.

: Sticking does not occur at all, normal holing is performed and very good running is attained.
: Although no problem exists in the running property and normal holing can be carried out, a weak sticking occurs when printing the paint-printing portions.
Δ: Although the film runs, normal holing cannot be carried out.
X: Tape does not run at all.

(13) Releasing Property

The overlapped and stuck laminated film and the polyester gauze as in (12) was overlapped with an original and holing was performed by irradiation of infrared flash. Thereafter, the original was peeled off. The resistance against the peeling off of the original at this time was rated according to the following criteria. Those showing the level not lower than [] were evaluated to have good anti-sticking property.

: Peeling is carried out without any resistance.
: Small resistance is felt but the accuracy of the holing is kept.
Δ: Although the original can be peeled off, the holed portions are deformed, so that it cannot be used as a stencil.
X: The original cannot be peeled off or the film or the original is broken.

(14) Evaluation of Clearness of Characters

The original carried JIS first level characters in the size of 2.0 mm square. The laminated film overlapped and adhered to the polyester gauze as used in (12) was processed using a mimeographing printer "Risograph" 007D (commercially available from Riso Kagaku Kogyo K.K.) and the printed characters were evaluated for:

1) chipping of characters and
2) unevenness of the thickness of the characters. Those which cannot be acceptable at all with respect to the above items 1) and 2) are expressed by the mark [X], those which showed no problem are expressed by the mark [], and those which showed some chipping of characters and some unevenness of the thickness of the characters but can be used are expressed by the mark [Δ].

(15) Evaluation of Paint-Printing

1) Evaluation of Clearness of Paint-Printing

An original carrying (circles painted in black) with diameters of 1–5 mm were printed in the same manner as in (14). The printed copy was evaluated for
  a) correspondence of the sizes of the circles in the original and the printed copy, and
  b) light and shade of the printed copy. Those which cannot be acceptable at all with respect to the above items a) and b) are expressed by the mark [X], those which showed no problem are expressed by the mark [], and those which showed a problem but can be used are expressed by the mark [Δ].

(16) Evaluation of Sensitivity

Using five kinds of pencils having hardness of 5H, 4H, 3H, 2H and H, respectively, characters were written under a pressure of 150 g. The thus prepared manuscript was subjected to printing and whether the characters can be read or not was checked. If the printed copy of the manuscript written with a pencil of 5H can be read, the sensitivity is highest, and the sensitivity is decreased with the decrease of the hardness of the hardest pencil which gave the readable printed copy.

[EXAMPLES]

The modes of the present invention will now be described by way of examples. It should be noted that the examples of the present invention are not restricted to those described below.

Example 1

PET pellets (intrinsic viscosity of 0.63 dl/g) containing 0.15% by weight of non-incorporated particles (particles precipitated during polymerization step) with particle sizes of 0.5–1.5 μm and 0.2% by weight of calcium carbonate particles with a particle size of about 1.5 μm were sufficiently dried in vacuum and then the pellets were fed to an extruder. The pellets were fused at 280° C. and the fused PET was filtered through a sintered metal filter with a cut size of 10μm. The fused PET was then extruded from a T-shaped die and the extruded film was wound about a cooling drum with a surface temperature of 30° C. so as to solidify the film. In this cooling step, to promote the intimacy between the film and the surface of the cooling drum, a wire electrode was disposed on the film and a voltage of DC 6 V was applied. The thus obtained non-oriented PET film was heated at 95° C. and was stretched in the longitudinal direction at a stretching ratio of 3.5 times the original length to obtain a uniaxially oriented film. One surface of the thus obtained uniaxially oriented film was subjected to corona discharge treatment, and an aqueous coating dispersion having the following composition was applied to the treated surface by the gravure coating method so as to attain the thickness of the coating after biaxial stretching of 0.04 μm.

[Composition of Coating Dispersion]

(a) Vegetable Wax 100 parts by weight ester compound of {hydrogenated rosin.α,β-substituted ethylene (α substituent: carboxylic group, β substituent: methyl)adduct}.C$_6$ alkyl polyalcohol (number of repeating units: 5)

To disperse the above-mentioned component (a) in water, a nonionic surfactant, a phosphate (butoxyethyl ester), ammonium oleate and 2-amino-2-methylpropanol in the amount of one part by weight each were added to the component (a) and these components were vigorously stirred in water. Further, the components were dispersed by an ultrasonic disperser to obtain an aqueous dispersion having a total solid content of 1.0% by weight.

The thus coated uniaxially oriented film was introduced to a tenter clamping the film with clips. Preliminary heating step at 110° C. was performed so as to evaporate the water and the film was then stretched in the transverse direction at 120° C. at a stretching ratio of 4.5 times the original length, followed by a heat treatment at 225° C. for 5 seconds to obtain a laminated polyester film having a thickness of the coating layer of 0.04 μm, surface roughness of the coating layer of 0.08 μm, and the thickness of the film of 5 μm. On the surface of the coating layer of this laminated film, fine elongated protrusions with length/width ratios of not less than 3 were formed at a density of 48 protrusions/100 μm$^2$.

The results of the evaluation of this laminated polyester film as a heat-sensitive image transfer material are shown in Table 1. The laminated polyester film did not show shedding in inking step and the adhesion of the ink was good. No sticking occurred during the printing test and staining and abrasion of the head were not observed.

Example 2

An aqueous dispersion with a total solid content of 1.0% by weight was prepared in the same manner as in Example 1 except that an equal weight of oxidized wax was added to the vegetable wax. Using this coating dispersion, a laminated polyester film was prepared as in Example 1. The thus prepared laminated polyester film had a surface roughness of the coating layer of 0.08 μm and a thickness of the coating layer of 0.04 μm. On the surface of the coating layer of this laminated film, fine elongated protrusions with length/width ratios of not less than 3 were formed at a density of 75 protrusions/100 μm$^2$.

The results of the evaluation of this laminated polyester film as a heat-sensitive image transfer material are shown in Table 1.

Comparative Example 1

Corona discharge treatment was performed on a surface of a biaxially oriented PET film with a thickness of 5 μm and a center line average surface roughness of 0.08 μm and the coating dispersion used in Example 1 was coated on this surface with a gravure coater to attain a coating thickness of 0.04 μm, followed by drying at 130° C. for 1 minute to obtain a laminated polyester film.

The results of the evaluation of this laminated polyester film as a heat-sensitive image transfer material are shown in Table 1. The elongated protrusions were not formed at all on the surface of the coating layer and the sticking was severe so that the anti-sticking property of this film was poor.

Comparative Examples 2 and 3

Laminated polyester films were prepared in the same manner as in Example 1 except that the coating liquid was an aqueous solution of polyether-modified silicone (Comparative Example 2) or an aqueous dispersion of fluorine-modified acrylic resin (Comparative Example 3).

The results of the evaluation of these laminated polyester films as heat-sensitive image transfer materials are shown in Table 1. These laminated films severely shed ink and the adhesion of the ink was poor.

Example 3

A laminated polyester film was prepared in the same manner as in Example 2 except that the following components (c) and (d) were added to 100 parts by weight of the solid content of the coating dispersion used in Example 2.

| (c) turbine oil | 5 parts by weight |
| (d) polyethylene glycol oil | 5 parts by weight |

After adding the components (c) and (d), an aqueous dispersion with a total solid content of 1% by weight was prepared as in Example 2.

On the surface of the coating layer of the thus prepared laminated film, protrusions with length/width ratios of not less than 5 were formed at a density of 103 protrusions/μm$^2$. The laminated film was evaluated as a heat-sensitive image transfer material. As a result, as shown in Table 1, the laminated film exhibited excellent printing/running properties. In particular, the running property in the sublimation type printer at high pulse width was especially good.

Comparative Example 4

To the coating dispersion used in Example 2, silica particles having an average particle size of 0.5 μm were added in the amount of 5% based on the weight of the solid content. Using this coating dispersion, a laminated polyester film was prepared in the same manner as in Comparative Example 1.

On the surface of the coating layer, protrusions (having length/width ratios of 1–2) were formed at a density of 63 protrusions/μm$^2$ due to the particles. This laminated film was evaluated as a heat-sensitive image transfer material. As shown in Table 1, in spite of the fact that protrusions are formed, since the shapes of the protrusions are different from that defined in the present invention, sticking occurred.

Example 4

A laminated polyester film was prepared in the same manner as in Example 1 except that the coating composition was that used in Example 3 and that the stretching was performed after drying the composition and during moisturizing the film.

On the surface of the coating layer of the laminated film, elongated protrusions were formed as in Example 2. The protrusions were randomly arranged and the protrusions were crossed each other or bent. As shown in Table 1, the laminated film was excellent in slipperiness and the properties as a heat-sensitive image transfer material were good.

Comparative Examples 5 and 6

Laminated polyester films were prepared in the same manner as in Example 1 except that the concentration of the coating composition was 7% by weight (Comparative Example 5) or 15% by weight (Comparative Example 6) and the thickness of the coating layers were as shown in Table 1.

As the thickness of the coating layer increases, the protrusion-forming property of the surface of the coating layer was changed. Those in which the number of protrusions or the shape of the protrusions is outside the range defined in the present invention had poor slipperiness and, as shown in Table 1, sticking occurred in the evaluation as a heat-sensitive image transfer material.

Example 5

To a copolymer of polyethylene terephthalate/isophthalate (85/15 mol %) with an intrinsic viscosity of 0.6, a PET with an intrinsic viscosity of 0.6 containing 2% by weight of silica particles with an average particle size of 0.1 $\mu$m was blended so as to attain a content of the silica particles after melt extrusion of 0.25% by weight. After sufficiently drying the thus prepared polyester in vacuum, the polyester was supplied to an extruder and was melt-extruded from a T-shaped die at 290° C. The extruded film was wound about a rotating cooling drum at 30° C. so as to solidify the film to obtain a non-oriented film. The non-oriented film was heated at 90° C. and was stretched in the longitudinal direction at a stretching ratio of 4.0 times the original length to obtain a uniaxially oriented film. Corona discharge treatment was performed in the air on one surface of this uniaxially oriented film, and the coating composition used in Example 2 was applied to the treated surface by the gravure coating method to the same thickness as in Example 2. The coated film was then introduced into a tenter heated by hot air at 90° C. clamping the film with clips so as to evaporate the water, and the film was stretched in the transverse direction at a stretching ratio of 3.5 times the original length. The film was then heat-treated at 160° C. to obtain a laminated polyester film having a thickness of the base film of 2.0 $\mu$m and a thickness of the coating layer of 0.04 $\mu$m.

On the surface of the coating layer, elongated protrusions with length/width ratios of not less than 3 were formed at a density of 82 protrusions/$\mu$m$^2$. A polyester gauze was stacked on the surface of the laminated film on which the coating layer was not formed and was adhered to the surface with an adhesive. The resultant was evaluated as a heat-sensitive mimeograph stencil. The results are shown in Table 2.

Example 6

A laminated polyester film was prepared in the same manner as in Example 5 except that the coating composition used in Example 3 was used.

The thus prepared laminated polyester film was evaluated as a heat-sensitive mimeograph stencil and the results are shown in Table 2. The laminated film exhibited excellent properties.

Comparative Examples 7 and 8

Laminated polyester films were prepared in the same manner as in Example 5 except that the coating composition was the same as that used in Comparative Example 2 or 3.

On the surfaces of the coating layers of the thus prepared laminated films, no elongated protrusions were formed at all. The films were evaluated as heat-sensitive mimeograph stencils. As shown in Table 2, as for that in which silicone was coated (Comparative Example 7), although the releasing property after irradiation of flash was good, sticking occurred in the thermal system. As for the film in which fluorine-modified acrylic resin was coated (Comparative Example 8), the releasing property, anti-sticking property and printing property were poor.

Comparative Example 9 and 10

A biaxially oriented polyester film used in Example 5 (thickness 2 $\mu$m) but not having the coating layer was prepared and on one surface thereof, a coating was formed in the same manner as in Comparative Example 1 or 4 to obtain laminated polyester films.

The film having no protrusions (Comparative Example 9) and the film in which the shape of the protrusions is outside the definition in the present invention (Comparative Example 10) had poor properties as heat-sensitive mimeograph stencils as shown in Table 2.

The results of the evaluation of these films as heat-sensitive mimeograph stencils are shown in Table 2. The prepared laminated films had no protrusions (Comparative Example 9) or the shape of the protrusions were outside the definition of the present invention (Comparative Example 10), so that the properties as the heat-sensitive mimeograph stencils were poor.

Industrial Applicability

As described above, since the laminated film of the present invention exhibits the above-described excellent advantageous effects when used as a heat-sensitive image transfer material or as a heat-sensitive mimeograph stencil, the film of the present invention is suited as a heat-sensitive image transfer material or heat-sensitive mimeograph stencil.

TABLE 1

|  | Example 1 | Example 2 | Comparative Example 1 | Comparative Example 2 | Comparative Example 3 |
|---|---|---|---|---|---|
| Formation of Protrusions | Formed | Formed | Not Formed | Not Formed | Not Formed |
| Length/Width | 3< | 3< | — | — | — |

TABLE 1-continued

|  |  |  |  |  |  |
|---|---|---|---|---|---|
| Density(Protrusions/100 $\mu m^2$) | 48 | 75 | 0 | 0 | 0 |
| Ra1 ($\mu m$) | 0.08 | 0.08 | 0.06 | 0.08 | 0.08 |
| Thickness of Coating Film ($\mu m$) | 0.04 | 0.04 | 0.04 | 0.04 | 0.04 |
| Static Friction Coefficients |  |  |  |  |  |
| $\mu S_1$ | 0.26 | 0.22 | 0.48 | 0.37 | 0.39 |
| $\mu S_2$ | 0.23 | 0.18 | 0.72 | 0.58 | 0.77 |
| Anti-sticking Property-1 | 9 V | 12 V | x | 8 V | x |
| Anti-sticking Property-2 | Δ | ○ | x | x | x |
| Staining of Head | ○ | ○ | x | ○ | x |
| Abrasion of Head | ○ | ○ | — | ○ | — |
| Inking | ○ | ○ | ○ | x | x |
| Adhesion of Ink | ○ | ○ | ○ | x | x |

|  | Example 3 | Comparative Example 4 | Example 4 | Comparative Example 5 | Comparative Example 6 |
|---|---|---|---|---|---|
| Formation of Protrusions | Formed | Formed | Formed | Formed | Formed |
| Length/Width | 5< | 1-2 | 5< | 5< | 5< |
| Density(Protrusions/100 $\mu m^2$) | 103 | 63 | 138 | 12 | 4 |
| Ra1 ($\mu m$) | 0.08 | 0.14 | 0.08 | 0.06 | 0.06 |
| Thickness of Coating Film ($\mu m$) | 0.04 | 0.04 | 0.04 | 0.15 | 0.32 |
| Static Friction Coefficients |  |  |  |  |  |
| $\mu S_1$ | 0.21 | 0.29 | 0.19 | 0.31 | 0.34 |
| $\mu S_2$ | 0.18 | 0.41 | 0.16 | 0.28 | 0.27 |
| Anti-sticking Property-1 | 13 V | x | 13 V | x | x |
| Anti-sticking Property-2 | ⊚ | x | ⊚ | x | x |
| Staining of Head | ○ | x | ○ | x | x |
| Abrasion of Head | ○ | — | ○ | — | — |
| Inking | ○ | ○ | ○ | ○ | ○ |
| Adhesion of Ink | ○ | ○ | ○ | ○ | ○ |

TABLE 2

|  | Example 5 | Example 6 | Comparative Example 7 | Comparative Example 8 | Comparative Example 9 | Comparative Example 10 |
|---|---|---|---|---|---|---|
| ΔHu (cal/g) | 7.3 | 7.3 | 7.3 | 7.3 | 7.3 | 7.3 |
| ΔTm (°C.) | 68 | 68 | 68 | 68 | 68 | 68 |
| Formation of Protrusions | Formed | Formed | Not Formed | Not Formed | Not Formed | Formed |
| Length/Width | 3< | 5< | — | — | — | 1-2 |
| Density(Protrusions/100 $\mu m^2$) | 82 | 126 | 0 | 0 | 0 | 58 |
| Thickness of Coating Film ($\mu m$) | 0.04 | 0.04 | 0.04 | 0.04 | 0.04 | 0.04 |
| Anti-sticking Property | ○ | ⊚ | x | x | x | x |
| Releasing Property | ⊚ | ⊚ | ⊚ | Δ | ○ | ○ |
| Character-Printing Property | ○ | ○ | Δ | x | ○ | x |
| Paint-Printing Property | ○ | ○ | Δ | x | Δ | x |
| Sensitivity | 5 H | 5 H | 3 H | less than H | 4 H | less than H |

We claim:

1. A laminated film for heat-sensitive image transfer material comprising:
   a polyester film;
   an anti-sticking layer containing as a major component a wax-based composition, said anti-sticking layer having protrusions with length/width ratios of not less than 3 at a density of not less than 20 protrusions/100 $\mu m^2$ and said anti-sticking layer having a center line average surface roughness of 0.03–0.4 $\mu m$.

2. The laminated polyester film of claim 1, wherein said wax-based composition is a petroleum wax or a vegetable wax which can be dissolved, emulsified or suspended in water.

3. The laminated polyester film of claim 1 or 2, wherein said coating layer containing as a major component the wax-based composition further contains an oily substance, and the weight ratio of said wax-based composition/oily substance is 100/1 to 1/1.

4. The laminated polyester film of claim 1, which is prepared by applying a coating liquid containing as a major component the wax-based composition on the surface of the polyester film before completion of the crystal orientation, and then completing the crystal orientation by subjecting the polyester film to drying, stretching and heat-treatment.

5. The heat-sensitive image transfer material of claim 1, wherein static friction coefficient ($\mu S_1$) between said anti-sticking layer and a sodium glass at 25° C., 65% relative humidity is not more than 0.3 and the ratio (($\mu S_2$)/($\mu S_1$)) of the static friction coefficient ($\mu S_2$) at 100° C. to said static friction coefficient at 25° C. ($\mu S_1$) is not more than 1.0.

6. The laminated polyester film claim 1, wherein said protrusions are formed of a material containing said wax-based composition as a major component.

7. A heat-sensitive image transfer material comprising:
   a polyester film;
   an ink layer formed on one surface of said polyester, which ink is melted or sublimated; and
   an anti-sticking layer on the surface of the polyester film, opposite the ink layer, containing as a major component a wax-based composition, said anti-sticking layer having protrusions with length/width ratios of not less than 3 at a density of not less than 20 protrusions/100 $\mu m^2$ and said anti-sticking layer having a center line average surface roughness of 0.03–0.4 $\mu m$.

8. The heat-sensitive ink transfer material of claim 7, wherein said wax-based composition is a petroleum wax or a vegetable wax which can be dissolved, emulsified or suspended in water.

9. The heat-sensitive ink transfer material of claim 7 wherein said coating layer containing as a major component the wax-based composition further contains an oily substance, and the weight ratio of said wax-based composition/oily substance is 100/1 to 1/1.

10. The heat-sensitive ink transfer material of claim 7, which is prepared by applying a coating liquid containing as a major component the wax-based composition on the surface of the polyester film before completion of the crystal orientation, and then completing the crystal orientation by subjecting the polyester film to drying, stretching and heat treatment.

11. The heat-sensitive image transfer material of claim 7, wherein static friction coefficient ($\mu S_1$) between said anti-sticking layer and a sodium glass at 25° C., 65% relative humidity is not more than 0.3 and the ratio (($\mu S_2$)/($\mu S_1$)) of the static friction coefficient ($\mu S_2$) at 100° C. to said static friction coefficient at 25° C. ($\mu S_1$) is not more than 1.0.

12. The heat sensitive image transfer material of claim 7, wherein said protrusions are formed of a material containing said wax-based composition as a major component.

* * * * *

UNITED STATES PATENT AND TRADEMARK OFFICE
CERTIFICATE OF CORRECTION

PATENT NO.  : 5,407,724
DATED       : April 18, 1995
INVENTOR(S) : Takashi Mimura, Seizo Aoki, Kazuo Matsuura and Kenji Tsunashima It is certified that error appears in the above-indentified patent and that said Letters Patent is hereby corrected as shown below:

On Title Page, at [54], please delete "IMAGE"; and
    at [30], please change "Nov. 14, 1990" to --Nov. 14, 1989--.

In Column 5, line 40, after "$mm^2$", please insert --,--; and
    line 42, after "$mm^2$", please insert --,--.

In Column 6, line 50, please change "oricurie" to --oricurie--;
    line 53, please change ".α" to --·α--; and
    line 55, please change ".$C_i$" to --·$C_i$--.

In Column 11, line 4, please delete "(2)"; and
    line 5, before "Center", please insert --(2)--.

In Column 12, line 27, before ":", please insert --O--;
    line 43, before "was", please change the quotation marks to --"O"--;
    line 48, before "was", please change the quotation marks to --"O"--;
    line 62, before "was", please change the quotation marks to --"O"--;
    line 67, before "was", please change the quotation marks to --"O"--.

In Column 13, line 51, please change "[ ]" to --[O]--;
    line 53, before ":", please insert --⊙--; and
    line 55, before ":", please insert --O--.

UNITED STATES PATENT AND TRADEMARK OFFICE
CERTIFICATE OF CORRECTION

PATENT NO. : 5,407,724
DATED : April 18, 1995
INVENTOR(S) : Takashi Mimura, Seizo Aoki, Kazuo Matsuura and Kenji Tsunashima It is certified that error appears in the above-indentified patent and that said Letters Patent is hereby corrected as shown below:

```
In Column 14, line 1, please change "[]" to --[O]--;
     line 3, before ":", please insert --⊚--;
     line 4, before ":", please insert --O--;
     line 24, please change "[]" to --[O]--;
     line 30, after "carrying", please insert --●--; and
     line 39, please change "[]" to --[O]--.

In Column 20, line 49, after "film", please insert --of--.
```

Signed and Sealed this

Third Day of October, 1995

*Attest:*

BRUCE LEHMAN

*Attesting Officer*   *Commissioner of Patents and Trademarks*